(12) United States Patent  
Connett

(10) Patent No.: US 8,061,735 B2  
(45) Date of Patent: Nov. 22, 2011

(54) VEHICLE WITH A PROTECTIVE PANEL

(75) Inventor: Jerry J Connett, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 302 days.

(21) Appl. No.: 12/410,723

(22) Filed: Mar. 25, 2009

(65) Prior Publication Data

US 2010/0244425 A1 Sep. 30, 2010

(51) Int. Cl.
| | |
|---|---|
| B62D 25/18 | (2006.01) |
| B62D 25/10 | (2006.01) |
| B60J 7/20 | (2006.01) |
| B60J 7/00 | (2006.01) |
| B62J 6/00 | (2006.01) |

(52) U.S. Cl. .......... 280/848; 296/136.08; 296/219; 180/69.24; 362/475

(58) Field of Classification Search .......... 280/847, 280/848; 180/69.2, 69.24; 362/475, 476, 362/480, 506, 507, 529, 539; 16/225; 296/136.08, 296/136.07, 136.13, 219

See application file for complete search history.

(56) References Cited

U.S. PATENT DOCUMENTS

| 2,379,341 | A | * | 6/1945 | Craig .......................... 280/848 |
|---|---|---|---|---|
| 2,634,138 | A | * | 4/1953 | Zabel .......................... 280/849 |
| 2,812,955 | A | * | 11/1957 | Urban et al. .................. 362/546 |
| 4,310,872 | A | * | 1/1982 | Lauve .......................... 362/505 |
| 4,376,546 | A | * | 3/1983 | Guccione et al. ............ 280/770 |
| 4,518,092 | A | * | 5/1985 | Contreras, Sr. .............. 220/520 |
| 6,135,530 | A | * | 10/2000 | Blaszczak et al. ........... 296/37.8 |
| 6,578,650 | B2 | * | 6/2003 | Ozawa et al. ................. 180/68.1 |
| 6,926,339 | B2 | * | 8/2005 | Gentile .................... 296/136.07 |
| 2007/0085361 | A1 | * | 4/2007 | Hauser ........................ 296/1.08 |

* cited by examiner

Primary Examiner — Jeffrey J Restifo  
Assistant Examiner — James M Dolak  
(74) Attorney, Agent, or Firm — Jeffrey P. Calfa; Mark C. Bach; Gerald W. Askew

(57) ABSTRACT

Embodiments disclosed herein provide a vehicle with a protective panel. In one embodiment, the vehicle comprises a frame to which components of the vehicle are attached. At least one fender is attached to the frame. An opening is located on the at least one fender. At least one of a headlight and a light assembly is disposed at the opening. A suspension system is attached to the frame, and the suspension system comprises at least one wheel disposed adjacent the opening. A protective panel is attached to the at least one fender and is located adjacent the at least one wheel and the opening. The protective panel includes an upper panel and a lower panel. The upper panel is joined to the lower panel by a living hinge so that at least one of the upper panel and the lower panel is movable between and open position and a closed position.

5 Claims, 3 Drawing Sheets

VEHICLE WITH A PROTECTIVE PANEL

BACKGROUND

Embodiments disclosed herein relate to a vehicle having a protective panel. More specifically, embodiments disclosed herein provide a vehicle with a protective panel that includes a living hinge.

Many vehicles include a protective panel that reduces the likelihood that an outside element can enter or contact an inner portion or component of a vehicle. For example, the protective panel can deflect an outside element, such as debris, road splash and the like, thereby preventing the outside element from coming into contact with an inner portion or component of the vehicle. Such protective panels may protect headlights, other light assemblies and portions of a bumper from debris and road splash. Currently, such a protective panel may use two separate panels inside a fender to protect the headlight, other light assembly and bumper. When access to a headlight or other light assembly is needed, e.g. to change a light bulb, the entire panel may need to be removed from the vehicle. This needed removal can add to cost of manufacturing and maintaining a vehicle.

It is desirable to improve this current construction.

SUMMARY

Embodiments disclosed herein provide a vehicle with a protective panel. In one embodiment, the vehicle comprises a frame to which components of the vehicle are attached. At least one fender is attached to the frame. An opening is located on the at least one fender. At least one of a headlight and a light assembly is disposed at the opening. A suspension system is attached to the frame, and the suspension system comprises at least one wheel disposed adjacent the opening. A protective panel is attached to the at least one fender and is located adjacent the at least one wheel and the opening. The protective panel includes an upper panel and a lower panel. The upper panel is joined to the lower panel by a living hinge so that at least one of the upper panel and the lower panel is movable between and open position and a closed position.

DETAILED DESCRIPTION

Figure 1:
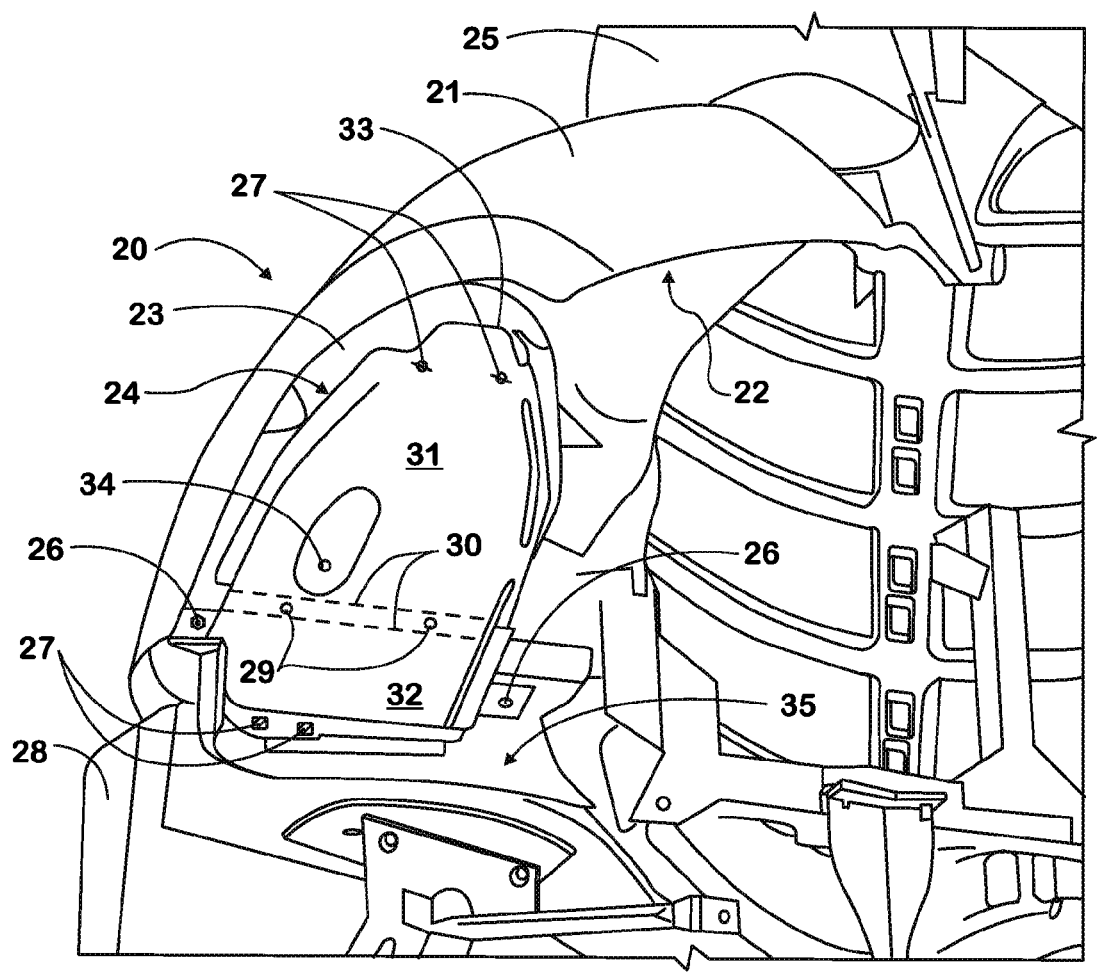
FIG. 1 is a perspective view of a vehicle having an embodiment of protective panel disclosed herein.

FIG. 1 shows a portion of a vehicle 20 that has a body, a chassis (both not shown for clarity) and a front bumper 28. Attached to the body is a hood 25 and a fender 21 located adjacent the hood 25. Located about the fender 22 is a light housing 23 for mounting a headlight 50 and turn signal 41 assemblies.

A protective panel 24 is attached to an interior of the fender 22, specifically adjacent the light housing 23 in one embodiment, via fasteners 29. In one embodiment, the protective panel 24 is a unitary or a single piece. In one embodiment, the protective panel 24 is constructed from a solid piece of polypropylene, thermoplastic polyolefin (TPO), or other material that allows for creation of a living hinge. The protective panel 24 covers and protects interior portions, e.g. of the light housing 23, and front bumper 28 from an outside element.

A living hinge 30 is located on either side of the fasteners 29. The living hinge 30 joins an upper panel 31 and a lower 32 panel. Tie upper panel 31 is attached adjacent the light housing 23 by fasteners 27 located opposite the living hinge 30. The fasteners 27 maintain the upper panel 31 is a closed position. In one embodiment, the fasteners 27 are two quarter-turn fasteners. In other embodiments, the fasteners 27 may be snap fasteners or other quick release fasteners.

In one embodiment, the lower panel 32 includes a bumper close-out 35. The lower panel 32, like the upper panel 31, is retained in the closed position by fasteners 27 located opposite the living hinge 30. In one embodiment, the fasteners 26 are snap fasteners. In some embodiments, the fasteners 26 and 27 may be interchangeable or may be substituted by another fastening device that allows for quick release.

In one embodiment, the protective panel 24 has a handle 33 located at least one of the upper panel 31 and the lower panel 32 to facilitate movement of at least one of the upper panel 31 and the lower panel 32 between an open position and a closed position. Additionally, an access hole 34 is located on at least one of the upper panel 31 and the lower panel 32. In one embodiment, the access hole 34 allows for adjustment of the headlight 50 by means of a screwdriver or other instrument without having to move the upper panel 31 or the lower panel into the open position.

Figure 2:
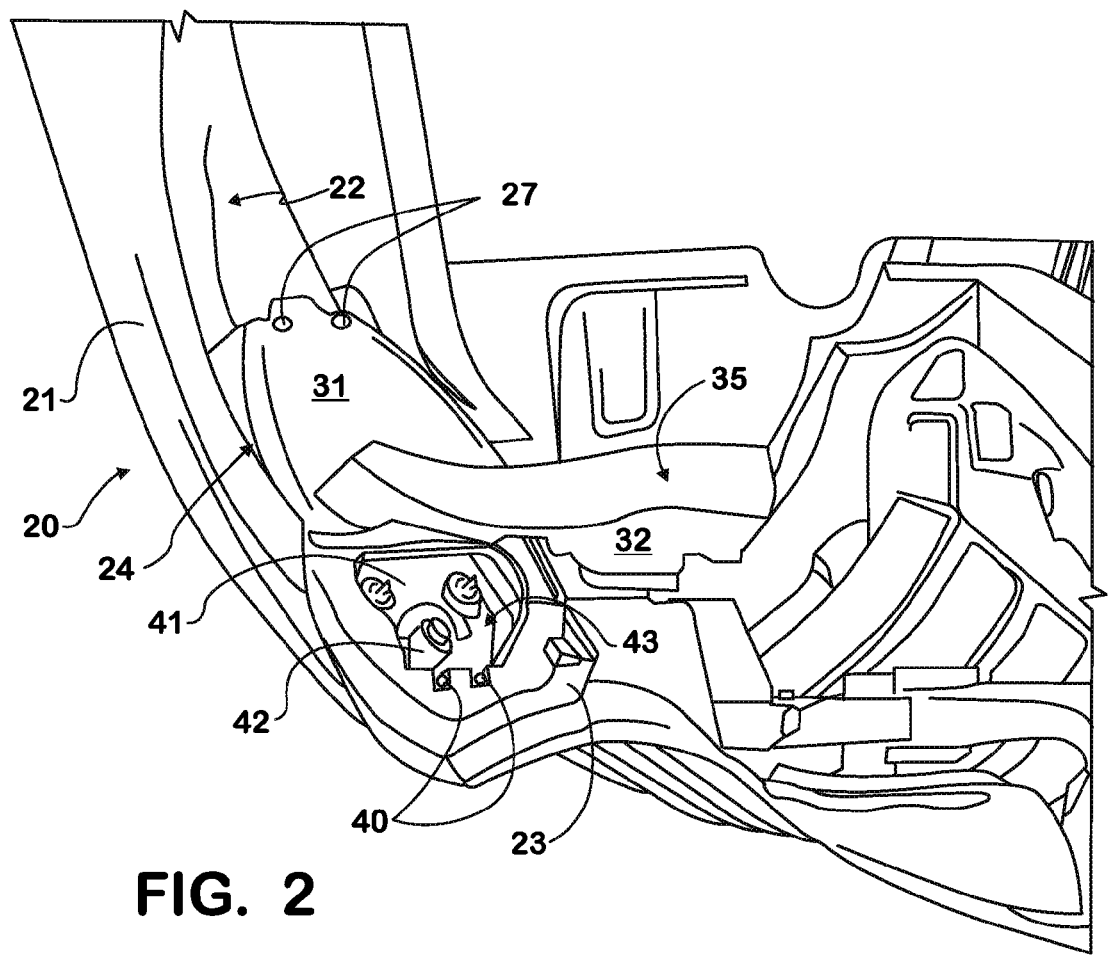
FIG. 2 is a view similar to that of FIG. 1 showing an embodiment of a protective panel with a portion in an open position.

FIG. 2 shows a protective panel 24 attached to an interior of the fender 22 with the lower panel 32 in an open position. When in the open position, the lower panel 32 allows access to a turn-signal assembly 41 through a turn-signal assembly access opening 43 in the lower panel 32. This arrangement provides a user with access to the turn signal assembly 41 and turn-signal bulb 42 without having to remove the entire protective panel 24. It is to be understood that some embodiments may include at least one opening disposed on at least one of the upper panel 31 and the lower panel 32.

Located adjacent the light housing 23 are two receptacles 40 which receive the fasteners 27 on the lower panel 32, thereby securing the lower panel 32 to an interior of the fender 22. An interior of the bumper (not shown for clarity), which is covered by the bumper close out 35 while the lower panel 32 is in a closed position, is exposed when the lower panel 32 is in the open position. When the lower panel 32 is in the closed position, the turn-signal assembly 41, its surrounding area, and interior of the bumper (not shown for clarity) are shielded from an outside element.

Figure 3:
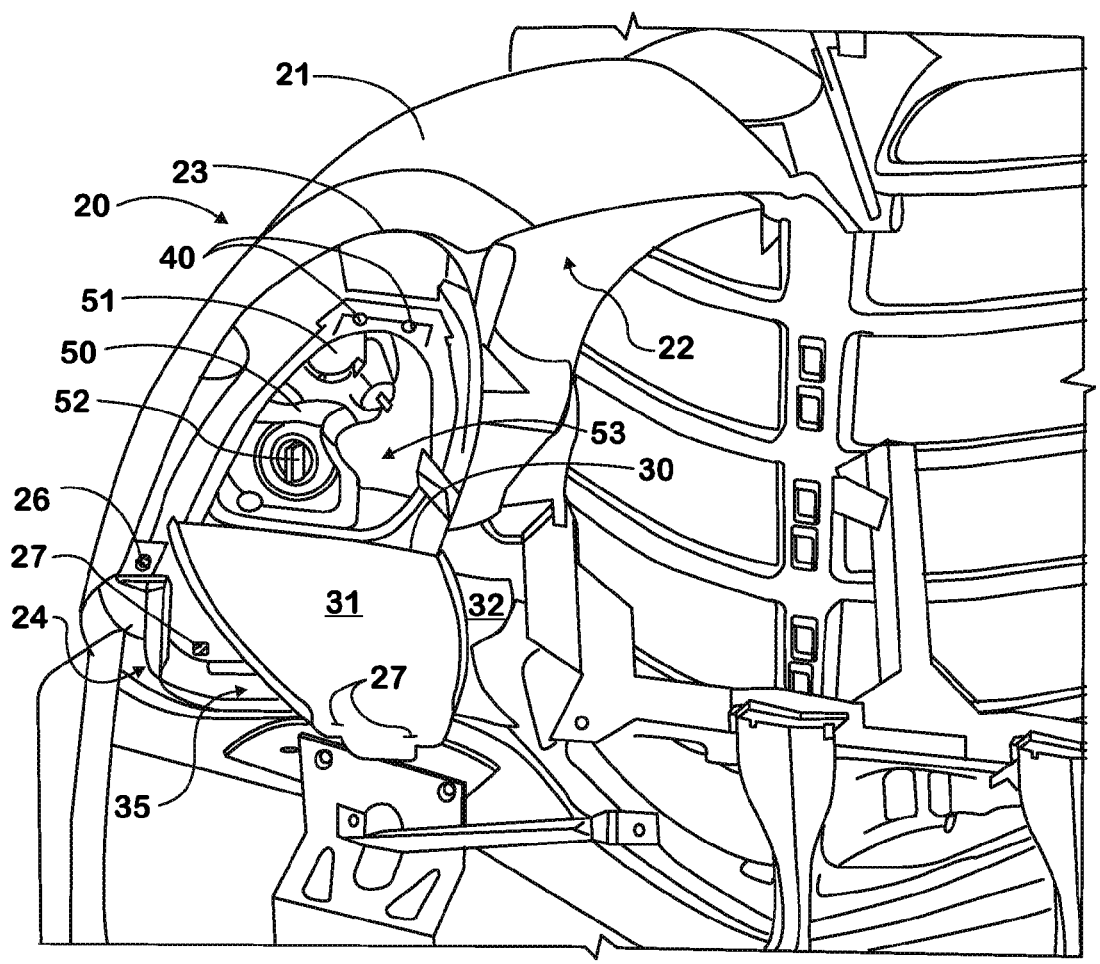
FIG. 3 is a view similar to that of FIG. 1 showing an embodiment of the protective panel with a portion in an open position.

FIG. 3 shows an embodiment of the protective panel 24 attached to an interior of the fender 22 with the upper panel 31 in the open position. When the upper panel 31 is in the open position, the upper panel 31 allows for access to a headlight 50 through an opening 53. The opening 53 provides access to the headlight 50, high beam bulb 51, and low beam bulb 52 without having to remove the panel 24. Located adjacent the light housing 23 are two receptacles 40 which receive the fasteners 27 on the upper panel 31 thereby securing the upper panel 31 to an interior of the fender 22. When the upper panel 31 is in the closed position, the headlight 50 and its surrounding area are shielded an outside element.

What is claimed is:

1. A vehicle with a protective panel comprising:
   a frame to which components of the vehicle are attached;
   at least one fender attached to the frame;
   a first opening located on the at least one fender;
   a second opening located on the at least one fender;

at least one headlight disposed at the first opening;

at least one turn signal disposed at the second opening;

a bumper attached to the frame, the bumper having an interior and an exterior;

a suspension system attached to the frame, wherein the suspension system comprises at least one wheel disposed adjacent the opening; and a protective panel attached to the at least one fender and located adjacent to the at least one wheel, the first opening, and the second opening, wherein the protective panel includes a first panel covering the first opening;

a second panel covering the second opening;

the first panel and second panel being separated by a first living hinge and a second living hinge;

at least one fastener being located between the first living hinge and the second living hinge and attaching the protective panel to the at least one fender so that the first panel is movable between an open position and a closed position and the second panel is movable between an open position and a closed position;

at least one of the first panel and second panel including a bumper close-out, the bumper close-out covering the interior of the bumper when in a closed position.

2. The vehicle as defined in claim 1 wherein the protective panel is made of at least one of polypropylene and thermoplastic polyolefin.

3. The vehicle as defined in claim 1 wherein the protective panel is a single piece.

4. The vehicle as define in claim 1 further comprising:

a handle located on at least one of the first panel and the second panel.

5. The vehicle as defined in claim 1 further comprising:

an access hole located on at least one of the first panel and the second panel.

\* \* \* \* \*